Patented Nov. 11, 1947

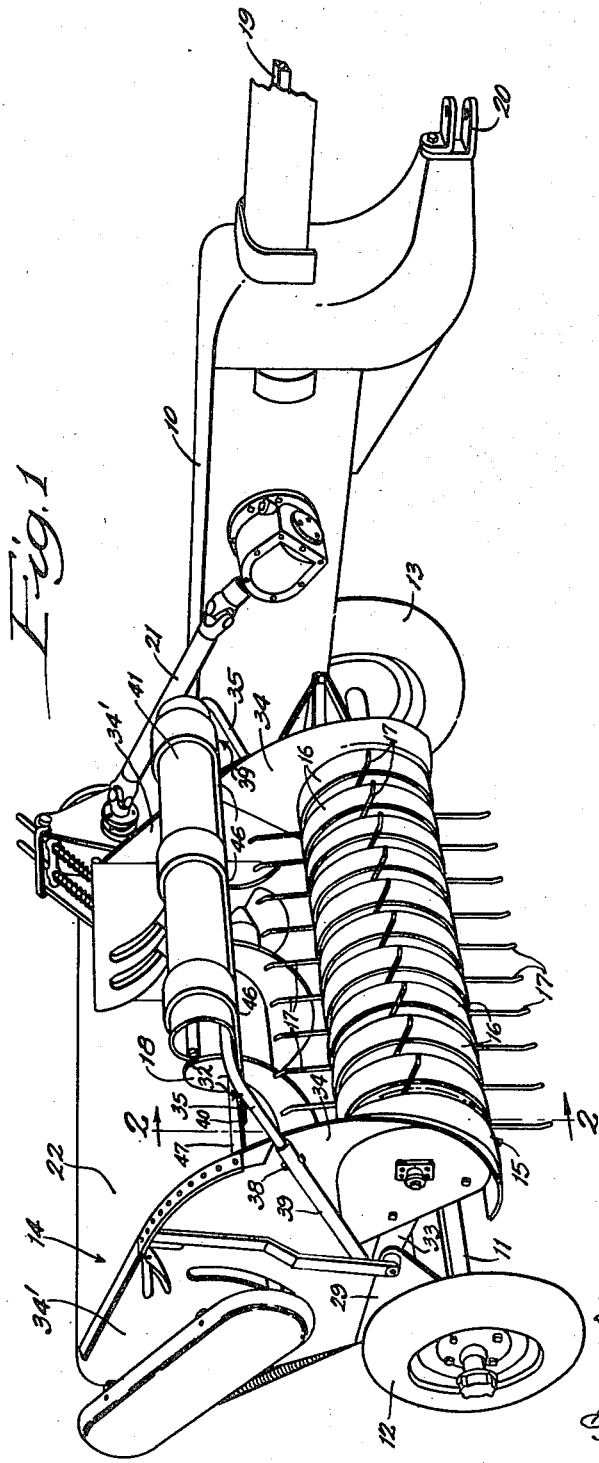

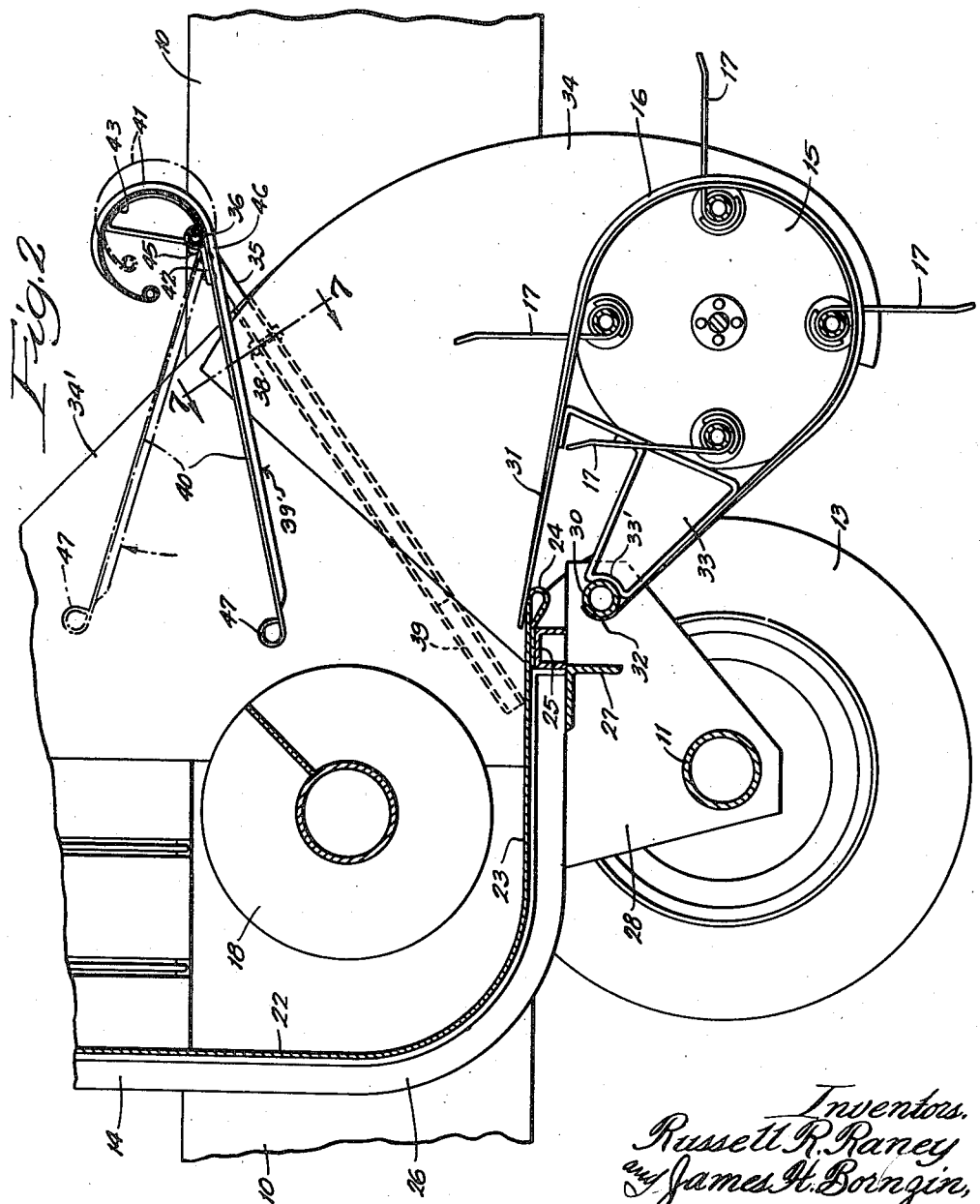

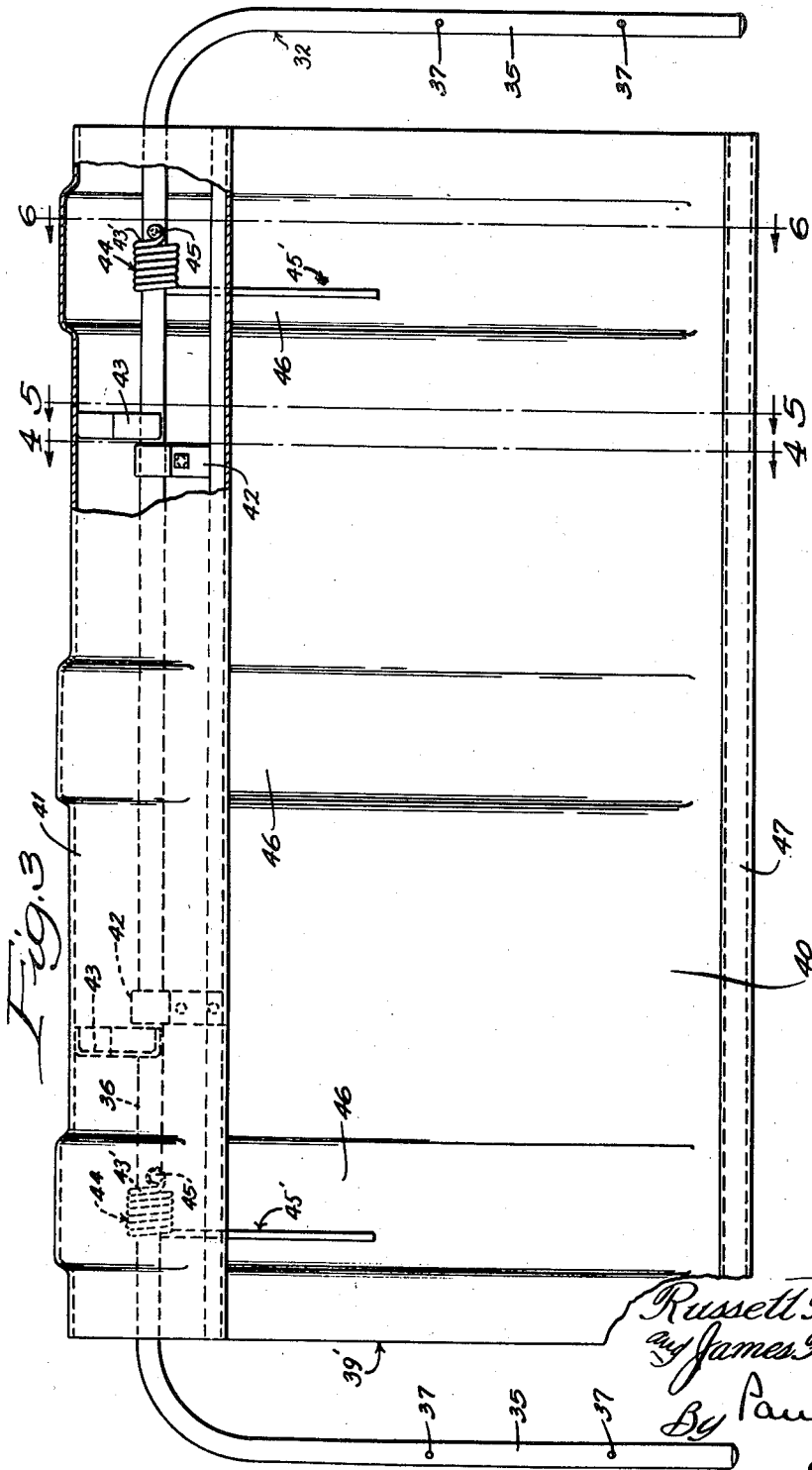

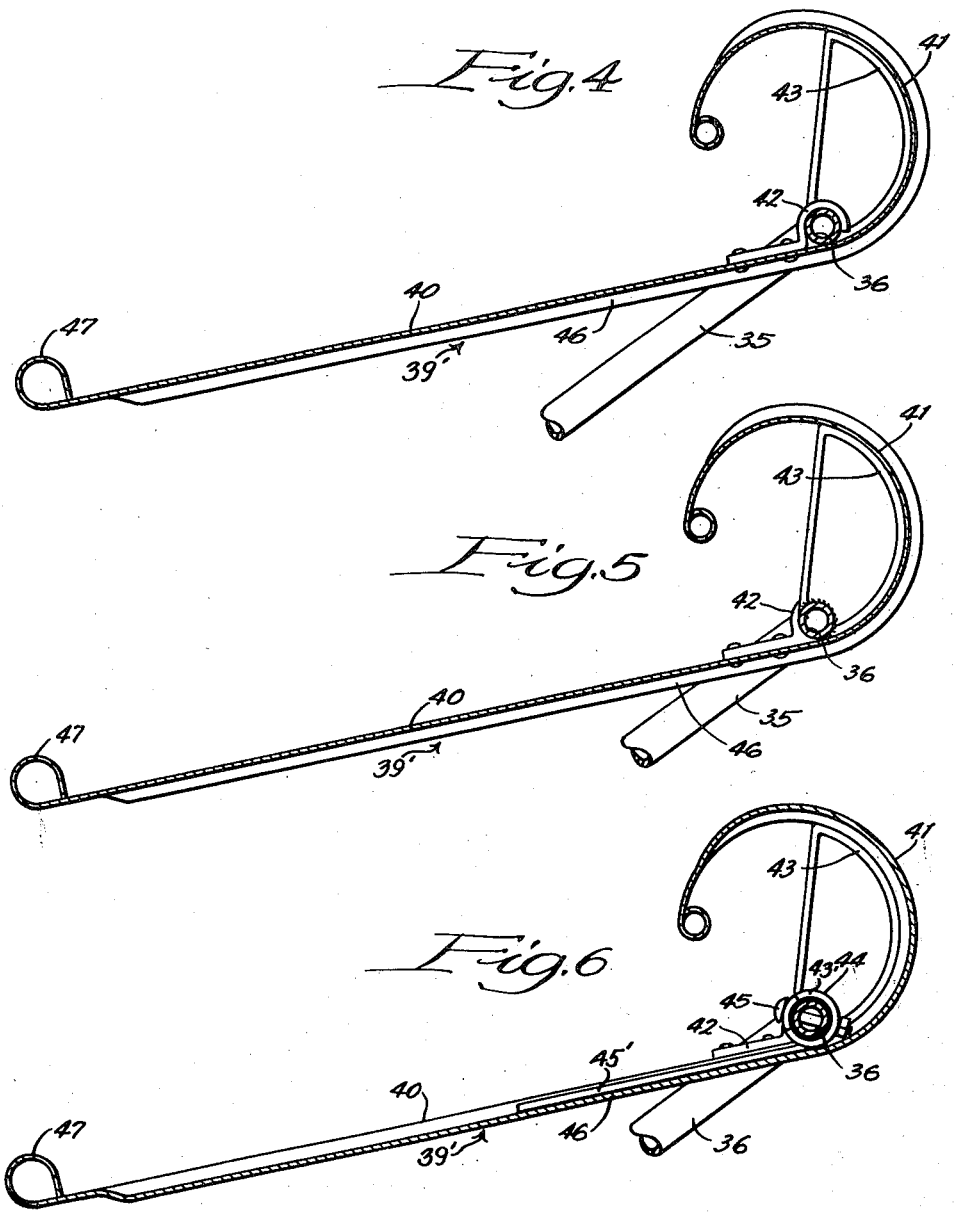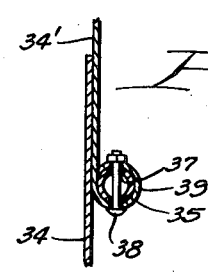

2,430,734

UNITED STATES PATENT OFFICE 2,430,734

RAKING AND LOADING LIFTING REEL

Russell R. Raney, La Grange, and James H. Bornzin, Chicago, Ill., assignors to International Harvester Company, a corporation of New Jersey Application April 13, 1944, Serial No. 530,810

15 Claims. (Cl. 56—364)

This invention relates to a pick-up baler. More specifically it relates to a feed assisting means for a pick-up baler having a pick-up device and a continuous feeding means. In recent years, there has been considerable development in traveling balers, that is, balers which are drawn across the field, picking up the hay and baling it in transit.

The prior Patent No. 2,259,908 shows a pick-up baler of this type. In the development of improved pick-up means and feeding means, it has been necessary to use means for controlling the flow of material and assuring its delivery from the pick-up device to the means for feeding the baling chamber.

The principal object of the present invention is to provide an improved material handling means for pick-up balers, particularly balers utilizing an auger feed.

A more specific object is to provide a packing and feed assisting structure which is resiliently urged downwardly against the material so as to handle different crops and crops of different volume.

Another specific object is to provide means for adjusting the position of a feed assisting means to provide for regulation for crops of different types.

These and other objects which will be apparent are accomplished by a construction as shown in the attached drawings, in which, Figure 1 is a perspective view of a pick-up baler embodying the improvement in the feed control mechanism constituting the invention;

Figure 2 is a longitudinal vertical section on a larger scale taken substantially on the line 2—2 of Figure 1;

Figure 3 is an enlarged plan view of the feed assisting mechanism apart from the baler;

Figure 4 is a section taken from line 4—4 of Figure 3;

Figure 5 is a section taken from line 5—5 of Figure 3;

Figure 6 is a section taken from line 6—6 of Figure 3; and

Figure 7 is a section taken from the line 7—7 of Figure 2.

The perspective view of Figure 1 shows generally an entire pick-up baler construction from an angle which best illustrates the relative positions of the units which cooperate with the feed assisting means constituting the present invention. This baler construction which is disclosed in detail in the copending application Serial No. 466,460, previously referred to, will be briefly described.

The main frame structure 10 is mounted on an axle structure 11 which carries wheels 12 and 13. A second frame structure and housing 14, extending laterally from the structure 10, is mounted on the axle structure 11. Said structure provides means for mounting a pick-up device referred to generally by the reference character 15. Said pick-up device includes spaced bands 16 between which projecting pick-up teeth 17 operate for engaging the crop, such as hay on the ground, lifting it upwardly over the bands 16 and delivering it rearwardly toward the feed auger 18. Said auger is driven in a direction to feed the gathered crop endwise of the auger into the baling chamber. A power take-off shaft 19 is illustrated which is driven from the power take-off of the tractor pulling machine. A hitch 20 is illustrated by means of which the baler is to be connected to the draw-bar of a tractor. In further description of parts it will be understood that the entire machine is drawn by the hitch 20 and that forward direction is in the direction of movement of the machine while in operation. Certain drive mechanism, including a shaft 21, has been illustrated but the details have not been shown as the invention is concerned entirely with the feed assisting means functioning in cooperation with the pick-up device 15 and the feed auger 18.

As better illustrated in Figure 2, the frame structure and housing 14 include a rear wall 22 spaced a substantial distance rearwardly from the flights leading from the spiral or auger 18, said wall extending downwardly around said spiral and terminating in a substantially horizontal bottom 23 spaced somewhat below the auger 18. It will be noted also, that the floor 23 extends a substantial distance forwardly of the auger, terminating in an underbent reinforcing edge 24 which hangs over a supporting channel 25. A supporting angle 26 is also illustrated which conforms to the wall 22 and the floor 23. A heavy transverse angle-bar 27 supports the entire structure, said bar being secured to a depending plate 28 which is mounted on the axle 11.

The plate 28 extends forwardly and forms in cooperation with a similar plate 29, at the other end of the machine, means for supporting a transverse horizontal pipe 30 which forms a supporting and connecting means for the pick-up device.

The pick-up device which has already been partially described is conventional in construction insofar as the construction of the subject matter is concerned. The curved bands 16, previously referred to, terminate in upwardly inclined portions 31 which overlap the edge of the bottom plate 23, whereby material delivered by the fingers or teeth 17 is pushed directly on to the floor 23 and into the path of the auger 18. The bands 16 extend around and underneath the pick-up device and in some instances are curved at their upper ends 32 around the pipe 30 to cooperate with a curved portion 33' of a pick-up frame bracket 33 to pivotally secure the pick-up device to the pipe 30. End plates 34 on the pick-up device overlap end walls 34' of the auger chamber to confine the delivery of the material to said auger chamber.

In the portion of the device as described up to this point, it is not uncommon in heavy crops for the pick-up device to deliver material against and over the auger, whereby it is not engaged by the auger sufficiently to be fed into the baling chamber. There is also a problem in handling light material on windy days, of the material blowing out of the auger chamber, particularly when the machine is operating against the wind. As best shown in Figures 1 and 3, an inverted U-shaped bail, designated in its entirety by the reference character 32', forms a supporting member having rearwardly inclined legs 35 and a connecting horizontal portion or member 36 forms a support forwardly of the auger and above the pick-up device. Said support which may be termed a bail may be adjusted away from and toward the machine by means of a plurality of openings 37 in the legs 35. In Figure 1, a bolt 38 is illustrated which will provide for the adjustment. The legs are slidably mounted in tubular members or pipes 39 which are secured to the end walls of the auger chamber extending at an angle forwardly and upwardly.

A presser or packer member 39' formed as a plate structure consisting of a flat portion 40 and an upwardly curved portion 41 extending from the forward end of the flat portion is connected by securing members 42 on the horizontal member 36 of the supporting structure. Said packer member is held in position by a plurality of semi-circular stop members 43 rigidly secured by any conventional means such as by welding to the horizontal member 36 and extending vertically above the horizontal member in a generally upward direction with the semi-circular side of the members extending in a forward direction. The curved portion 41 of the packer member is substantially cylindrical in shape extending completely around the stops 43. Said stops limit the pivoting movement of the packer member in a downward direction as shown by solid lines in Figure 2, but permit its upward movement to the dotted line position shown in Figure 2.

As best shown in Figure 6, resilient means are provided for urging the packer member in a downward direction limited by the stops 43. The resilient means include springs 44 coiled around the horizontal member 36, one end 43' of each spring being secured by a bolt 45 and the other end 45' extending along the upper surface of the flat portion of the packer member. Said packer member which is formed of a metallic sheet is provided with a plurality of embossed or channel-like indentations 46 extending transversely thereof and entirely around the curved portion. The leg ends 45' of the springs 44 lie respectively in said indentations which form means to prevent lateral deflection of the spring ends.

In the operation of the feed assisting means and packing structure as above described, the flat or substantially horizontal portion of the packing member 40 is urged downwardly by the springs 44, whereby the material delivered by the pick-up device is urged against the bottom 23 of the auger chamber assuring engagement of the material by the auger whereby it will be fed in a positive manner to the baling chamber. The packer member is free to rise against the springs when a large volume of material is delivered. It will be noted that the rear end of the packer member which is reinforced by a cylindrical edge 47 terminates closely adjacent the auger, thereby preventing material from passing upwardly over the auger and accumulating in a loose position above the auger where it will not be engaged. The packer member also prevents light material from blowing upwardly, and during operation with light material, the member may be adjusted close to the pick-up device and the floor 23 of the auger chamber to assure delivery of the material directly into the spiral of the auger.

It is to be understood that applicants have shown, described, and explained the operation of a preferred embodiment of their improved feed assisting means for pick-up balers and that they claim as their invention all modifications falling within the scope of the appended claims.

What is claimed is:

1. A feed-assisting mechanism for a material-collecting machine having a pick-up mechanism, comprising a horizontal supporting member spaced above the pick-up mechanism, a plate structure having a substantially flat portion extending over the pick-up mechanism and extending rearwardly adjacent the conveying means, said supporting member having stop members rigidly connected thereto at laterally spaced points, said stop members being engageable with the plate structure and being constructed and arranged to limit downward movement of the plate structure towards the pick-up mechanism to thereby provide at all times a space therebetween for the passage of material, and means for holding the plate structure on the supporting member for pivoting movement with respect thereto.

2. A feed-assisting mechanism for a material-collecting machine having a pick-up mechanism and conveying means rearwardly from the pick-up mechanism, comprising a horizontal supporting member spaced above the pick-up mechanism, a plate structure having a substantially flat portion extending over the pick-up mechanism and extending rearwardly adjacent the conveying means, said supporting member having stop members rigidly connected thereto at laterally spaced points, said stop members being engageable with the plate structure and being constructed and arranged to limit downward movement of the plate structure towards the pick-up mechanism and the conveying means to thereby provide at all times a space therebetween for the passage of material, and means for holding the plate structure on the supporting member for pivoting movement with respect thereto.

3. A feed-assisting mechanism for a material-collecting machine having a pick-up mechanism and transverse conveying means rearwardly of and above the pick-up mechanism, comprising a horizontal supporting member spaced above the pick-up mechanism, a plate structure having a substantially flat portion extending over the pick-up mechanism and extending rearwardly adjacent the conveying means, said supporting member having stop members rigidly connected thereto at laterally spaced points, said stop members being engageable with the plate structure and being constructed and arranged to limit downward movement of the plate structure towards the pick-up mechanism and the conveying means to thereby provide at all times a space therebetween for the passage of material, and means for holding the plate structure on the supporting member for pivoting movement with respect thereto.

4. A feed-assisting mechanism for a material-collecting machine having a pick-up mechanism and a transverse material-feeding auger spaced above and rearwardly from the pick-up mechanism, comprising a horizontal supporting member spaced above the pick-up mechanism, a plate structure having a substantially flat portion extending over the pick-up mechanism and extending rearwardly adjacent the conveying means, said supporting member having stop members rigidly connected thereto at laterally spaced points, said top members being engageable with the plate structure and being constructed and arranged to limit downward movement of the plate structure towards the pick-up mechanism and the conveying means to thereby provide at all times a space therebetween for the passage of material, and means for holding the plate structure on the supporting member for pivoting movement with respect thereto.

5. A feed-assisting mechanism for a material-collecting machine having a pick-up mechanism, comprising a horizontal supporting member spaced above the pick-up mechanism, a plate structure having a substantially flat portion extending over the pick-up mechanism and extending rearwardly adjacent the conveying means, said supporting member having stop members rigidly connected thereto at laterally spaced points, said stop members being engageable with the plate structure and being constructed and arranged to limit downward movement of the plate structure towards the pick-up mechanism and the conveying means to thereby provide at all times a space therebetween for the passage of material, means for holding the plate structure on the supporting member for pivoting movement with respect thereto, and spring means for resiliently urging said plate structure downwardly towards the pick-up mechanism.

6. A feed-assisting mechanism for a material-collecting machine having a pick-up mechanism and a conveying means at the rear of the pick-up mechanism, comprising a horizontal supporting member spaced above the pick-up mechanism, a plate structure having a substantially flat portion extending over the pick-up mechanism and extending rearwardly adjacent the conveying means, said supporting member having stop members rigidly connected thereto at laterally spaced points, said stop members being engageable with the plate structure and being constructed and arranged to limit downward movement of the plate structure towards the pick-up mechanism and the conveying means to thereby provide at all times a space therebetween for the passage of material, means for holding the plate structure on the supporting member for pivoting movement with respect thereto, and spring means for resiliently urging said plate structure downwardly.

7. In a harvesting machine having an overshot pick-up mechanism, a packing mechanism comprising a horizontal supporting member spaced above and forwardly of the pick-up mechanism, a plate structure having a substantially flat portion extending rearwardly from said member over the pick-up device and a portion curved forwardly and upwardly around said member, said supporting member having stop members rigidly connected thereto at laterally spaced points, said members being fitted within the curved portion of the plate structure, means for holding the plate structure on the supporting member for pivoting movement with respect thereto, and spring means for resiliently urging said plate structure downwardly towards the pick-up mechanism.

8. In a harvesting machine having an overshot pick-up mechanism, a packing mechanism comprising a horizontal supporting member spaced above and forwardly of the pick-up mechanism, means for adjusting said member vertically, a plate structure having a substantially flat portion extending rearwardly from said member over the pick-up device and a portion curved forwardly and upwardly around said member, said supporting member having stop members rigidly connected thereto at laterally spaced points, said members being fitted within the curved portion of the plate structure, means for holding the plate structure on the supporting member for pivoting movement with respect thereto, and spring means for resiliently urging said plate structure downwardly towards the pick-up mechanism.

9. In a harvesting machine having an overshot pick-up mechanism and transverse auger material conveying means, a feed assisting mechanism comprising a horizontal supporting member spaced above the pick-up mechanism and forwardly of the conveying means, means for adjusting said member vertically, a plate structure having a substantially flat portion extending rearwardly from said member over the pick-up device and a portion curved forwardly and upwardly around said member, said supporting member having stop members rigidly connected thereto at laterally spaced points, said members being fitted within the curved portion of the plate structure, clamping means for holding the plate structure on the supporting member for pivoting movement with respect thereto, and spring means for resiliently urging said plate structure downwardly towards the pick-up mechanism.

10. In a harvesting machine having an overshot pick-up mechanism and conveying means at the rear of the pick-up mechanism, a feed assisting mechanism comprising a horizontal supporting member spaced above the pick-up mechanism and forwardly of the conveying means, means for adjusting said member vertically, a plate structure having a substantially flat portion extending rearwardly from said member over the pick-up device and a portion curved forwardly and upwardly around said member, said supporting member having stop members rigidly connected thereto at laterally spaced points, said members being fitted within the curved portion of the plate structure, clamping means for holding the plate structure on the supporting member for pivoting movement with respect thereto, and spring means for resiliently urging said plate structure downwardly towards the pick-up mechanism.

11. In a harvesting machine having an overshot pick-up mechanism, a packing mechanism comprising a horizontal supporting member spaced above and forwardly of the pick-up mechanism, a plate structure having a substantially flat portion extending rearwardly from said member over the pick-up device and a substantially cylindrical portion curved forwardly and upwardly around said member, said supporting member having substantially semi-circular stop members rigidly connected thereto at laterally spaced points, said members being fitted within the cylindrical portion of the plate structure, clamping means for holding the plate structure on the supporting member for pivoting movement with respect thereto, and spring means for resiliently urging said plate structure downwardly towards the pick-up mechanism.

12. In a harvesting machine having an overshot pick-up mechanism and a conveying means at the rear of the pick-up mechanism, a packing mechanism comprising a horizontal supporting member spaced above the pick-up mechanism and forwardly of the conveying means, a plate structure having a substantially flat portion extending rearwardly from said member over the pick-up device and a substantially cylindrical portion curved forwardly and upwardly around said member, said supporting member having substantially semi-circular stop members rigidly connected thereto at laterally spaced points, said members being fitted within the cylindrical portion of the plate structure, clamping means for holding the plate structure on the supporting member for pivoting movement with respect thereto, and spring means for resiliently urging said plate structure downwardly towards the pick-up mechanism.

13. In a harvesting machine having an overshot pick-up mechanism, a packing mechanism comprising a forwardly and upwardly extending bail having a horizontal portion spaced above the pick-up mechanism, means for adjusting said bail vertically, a plate structure having a substantially flat portion extending rearwardly from the horizontal portion of the bail over the pick-up device and a substantially cylindrical portion curved forwardly and upwardly around said horizontal bail portion, said bail portion having substantially semi-circular stop members rigidly connected thereto at laterally spaced points, said members being fitted within the cylindrical portion of the plate structure when it is in its depressed position, clamping means for holding the plate structure on the horizontal bail portion for pivoting movement with respect thereto, and spring means for resiliently urging said plate structure downwardly toward the pick-up mechanism.

14. A device as set forth in claim 13 in which the resilient means are springs coiled around the horizontal portion of the bail and in which the plate structure is reinforced by a downwardly bent-out portion extending at right angles to the horizontal bail portion of the shaft, said bent-out portions providing means for holding the ends of the spring.

15. In a harvesting machine having an overshot pick-up mechanism, a packing mechanism comprising a forwardly and upwardly extending bail having a horizontal portion spaced above the pick-up mechanism, means for adjusting said bail vertically, a plate structure having a substantially flat portion extending rearwardly from the horizontal portion of the bail over the pick-up device and a substantially cylindrical portion curved forwardly and upwardly around said horizontal bail portion, said bail portion having substantially semi-circular stop members rigidly connected thereto at laterally spaced points, and extending upwardly therefrom, said members being fitted within the cylindrical portion of the plate structure to provide stops when it is in its depressed position, clamping means for holding the plate structure on the horizontal bail portion for pivoting movement with respect thereto, and spring means for resiliently urging said plate structure downwardly toward the pick-up mechanism.

RUSSELL R. RANEY.
JAMES H. BORNZIN.

REFERENCES CITED

The following references are of record in the file of this patent:

UNITED STATES PATENTS

| Number | Name | Date |
|---|---|---|
| 1,815,327 | Raney et al. | July 21, 1931 |
| 981,894 | Spinney | Jan. 17, 1911 |
| 1,313,418 | Reed | Aug. 19, 1919 |
| 2,221,236 | Gay, Jr. | Nov. 12, 1940 |